CHARACTER RECOGNITION SYSTEM

Original Filed Dec. 30, 1957 4 Sheets-Sheet 1

INVENTORS.
EVON C. GREANIAS
ARTHUR HAMBURGEN
BY Paul M. Brannen
AGENT

United States Patent Office 3,247,484
Patented Apr. 19, 1966

3,247,484
CHARACTER RECOGNITION SYSTEM
Evon C. Greanias, Chappaqua, and Arthur Hamburgen, Endicott, N.Y., assignors to International Business Machines Corporation, New York, N.Y., a corporation of New York
Original application Dec. 30, 1957, Ser. No. 706,087, now Patent No. 3,105,956, dated Oct. 1, 1963. Divided and this application June 24, 1963, Ser. No. 289,912
4 Claims. (Cl. 340—146.3)

Figure 1:
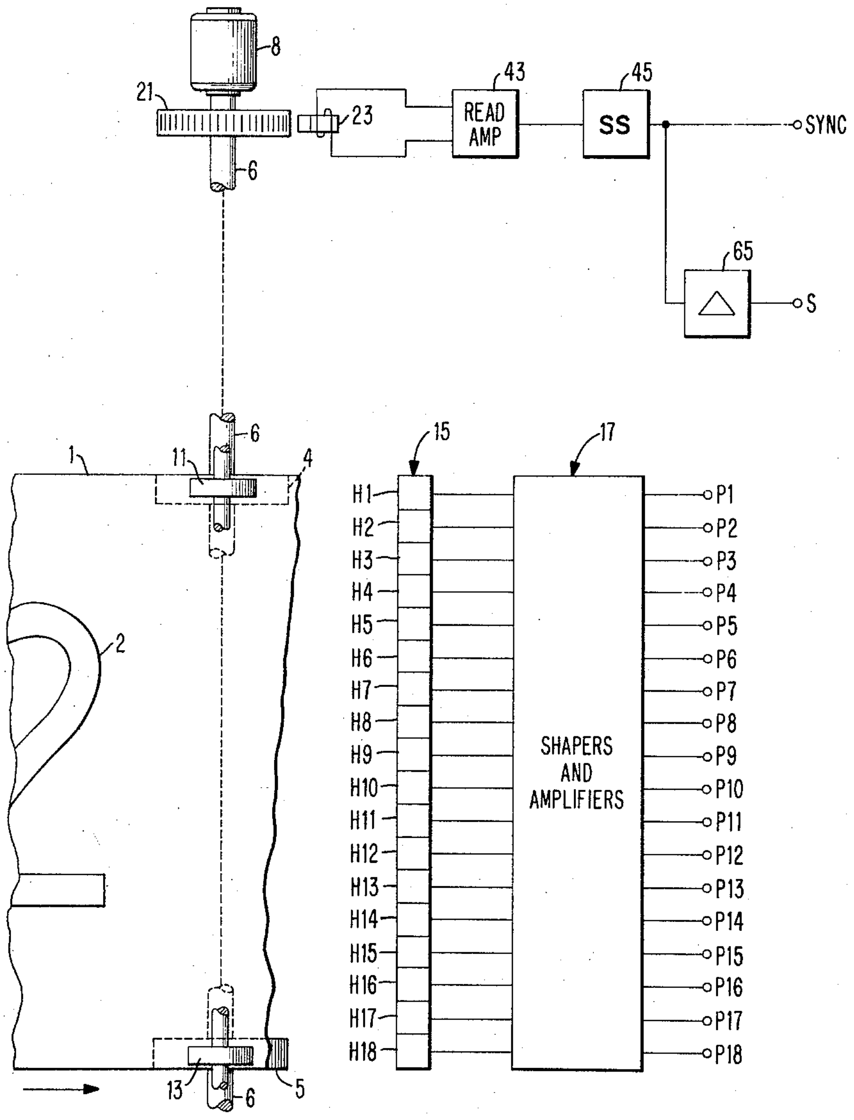

This invention relates to character recognition systems, and particularly to an improved character recognition system employing matching techniques which utilize electronic components and circuits to achieve high speed character recognition with a relatively small amount of apparatus, and without recourse to slow or unwieldy arrangements for compensating for misalignment of characters with respect to the scanning devices.

This application is a division of application Serial No. 706,087, filed on December 30, 1957, by E. C. Greanias and A. Hamburgen, now U.S. Patent 3,105,956.

The primary object of this invention is to provide an improved character recognition system.

One of the most basic sources of information in the business or scientific fields is the printed document. The information in these documents is normally transcribed manually into some media, such as punched cards or tape so as to be suitable for machine use. In the present invention the information on the document in the form of characters is scanned by suitable apparatus to produce signal patterns which are then analyzed to identify the character scanned.

Various systems have previously been proposed for sensing characters such as printed or otherwise formed letters on material. Such characters may be alphabetic letters, numerals or various special symbols. Some of the earlier arrangements for sensing characters involved the use of a beam of light which progressively traverses the character and causes the characteristics of the area traversed to control the operation of a light sensitive device of variation in reflected or transmitted light. The logic arrangements used in these systems to identify the character was generally dependent upon the times during which certain unique portions of the character were sensed by the scanning beam. Such systems are relatively slow and are limited to the sensing of characters which are properly positioned in relation to the scanning beam and in many instances such characters had to be specially formed. Other attempts were made along similar lines utilizing characters which were specially formed to include a code mark in the vicinity of the character with character recognition being accomplished by sensing the code mark or marks rather than the character itself. Although this provides a relatively simple means of identifying characters, such arrangements have seen little use in view of the fact that special printing equipment was required to print characters of this type and in many instances the printing is not suitable from an appearance standpoint because of the code marks.

Still another approach to character recognition involves a mechanical mask matching technique. In such arrangements, the image of the character is compared with suitable masks usually provided on an opaque disc and arranged so that a photocell detects the matching of the character image and the mask on the disc to then provide an output signal indicative of the identity of the character.

Still other character recognition systems are arranged to scan a character to be recognized and to then derive a suitable coded information from the scanning information, which coded information is then analyzed by suitable circuits to determine whether or not a particular character has been scanned. These arrangements are useful in situations where misalignment of printing occurs, since they thereby make it possible to reduce the amount of information which must be analyzed in order to completely scan the entire area in which the character may appear.

The present invention differs from the arrangements previously proposed in that the characters are scanned by suitable scanning means as they are fed past a scanning station by a document transport system, and the scanning information is provided in its original character form, in which it represents actual information derived from the scanning of a character, rather than an encoded or reduced form. This information is then supplied to a suitable matrix in which the information is shifted through the matrix in synchronism with the motion of the character past the scanning device, with suitable logic circuit means connected to the storage matrix so that, when the character information occupies a predetermined arrangement of storage positions, an output circuit will be energized to provide an indication of the character scanned.

Since the storage matrix can be operated at electronic speeds to shift the character information through various possible configurations, it is possible to use this dynamic comparison arrangement at relatively high speeds compared with previously known systems.

The characters to be recognized may appear in different forms, such as for example, graphic characters printed on paper or record cards. In the case of printed characters, these characters may be scanned by suitable light beam scanning devices in which there is provided a photomultiplier which is responsive to varying degrees of light reflected from the document during the scanning operation. Also, image dissecting apparatus could be used wherein successive portions of the character would be presented to the photomultiplier or light sensitive device, the character itself being fully illuminated. Parallel scanning is employed, in the present invention, by utilizing a plurality of photoresponsive devices arranged in a line transverse to the motion of a document to be scanned, with suitable slits or apertures so that the light which reaches each photoconductive device reflects the scanning of a small portion of the character, with a plurality of adjacent portions being scanned simultaneously.

The invention is not limited to use with optical scanning devices for scanning printed characters by transmitted or reflected light, but is also applicable to the scanning of magnetic characters, that is, characters formed in such manner as to include a magnetizable or magnetized substance in the character configuration, and wherein parallel scanning pickup or sensing heads are arranged so that, as the magnetized or magnetizable character passes thereunder, the change in the magnetic field conditions caused by the magnetic portions of the character will provide signals which will then be analyzed by the subsequent portion of the system.

Another object of the present invention is to provide a character recognition system capable of recognizing a complete set of alphanumeric characters in a large number of different type fonts.

Another object of the invention is to provide an improved character recognition system for recognizing either conventionally printed or magnetic characters and providing output signals indicative of the characters recognized in accordance with patterns of information derived from scanning the characters.

Still a further object of the invention is to provide a character recognition system in which the characters to be recognized are scanned and the information derived therefrom is supplied to a storage matrix by means synchronized with the scanning, whereafter the information is advanced through the storage matrix in synchronism with the scanning means and various combinations of information are determined at predetermined points in the matrix by suitable logic circuits to provide an output indicative of the character scanned.

The foregoing and other objects, features and advantages of the invention will be apparent from the following more particular description of a preferred embodiment of the invention, as illustrated in the accompanying drawings.

Figure 2:
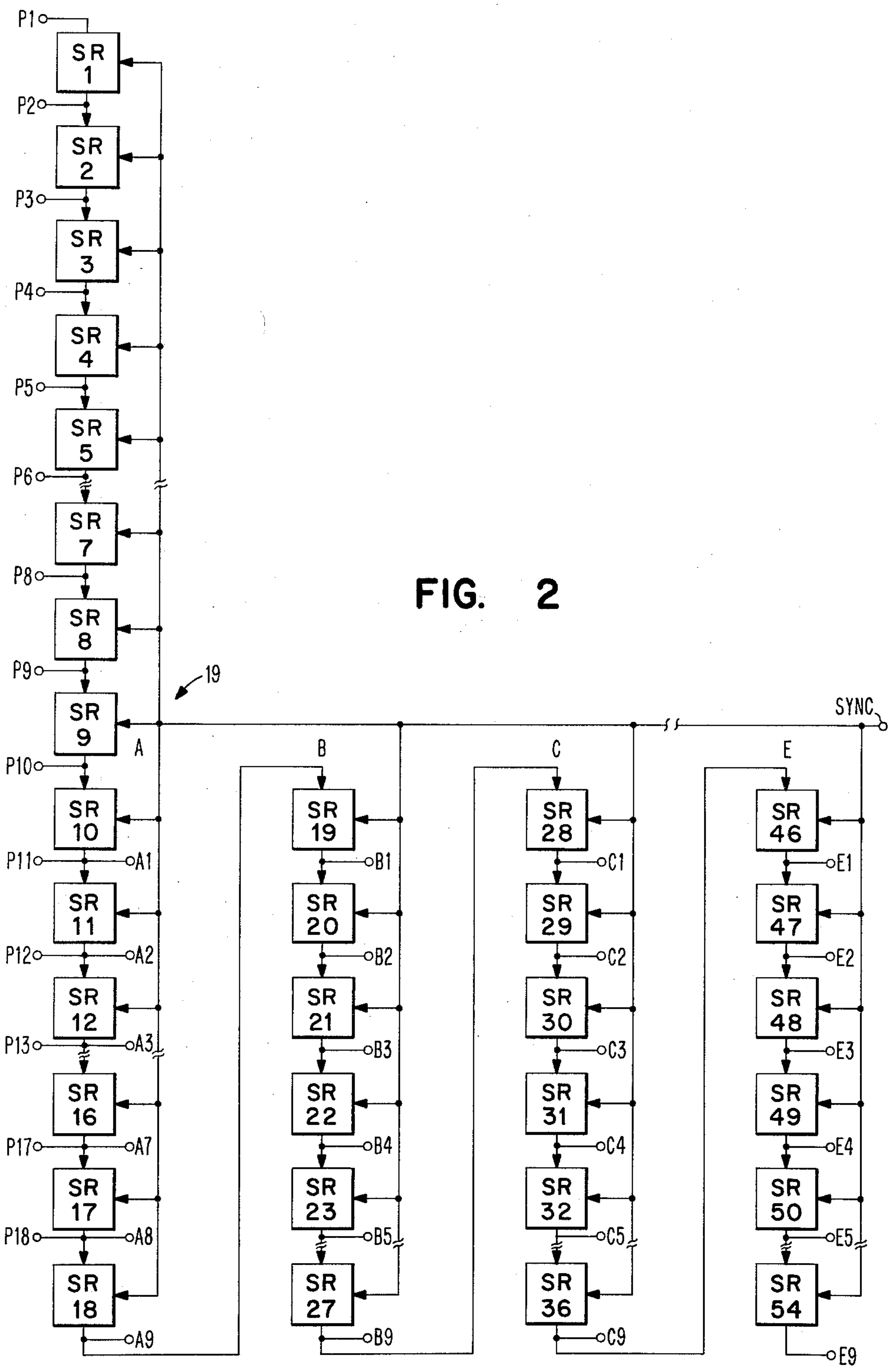

In the drawings:

FIGS. 1 and 2, taken together, illustrate, in schematic form, a preferred embodiment of the present invention.

FIGS. 3*a* through 3*j* show in symbolic representation the character outlines of a set of characters which may be recognized by the system illustrated in the drawings of FIGS. 1 and 2, and indicate in tabular form the necessary arrangement of the inputs to the diode logic circuits from the shifting register matrix in order to determine whether the associated character has been recognized.

Figure 4:
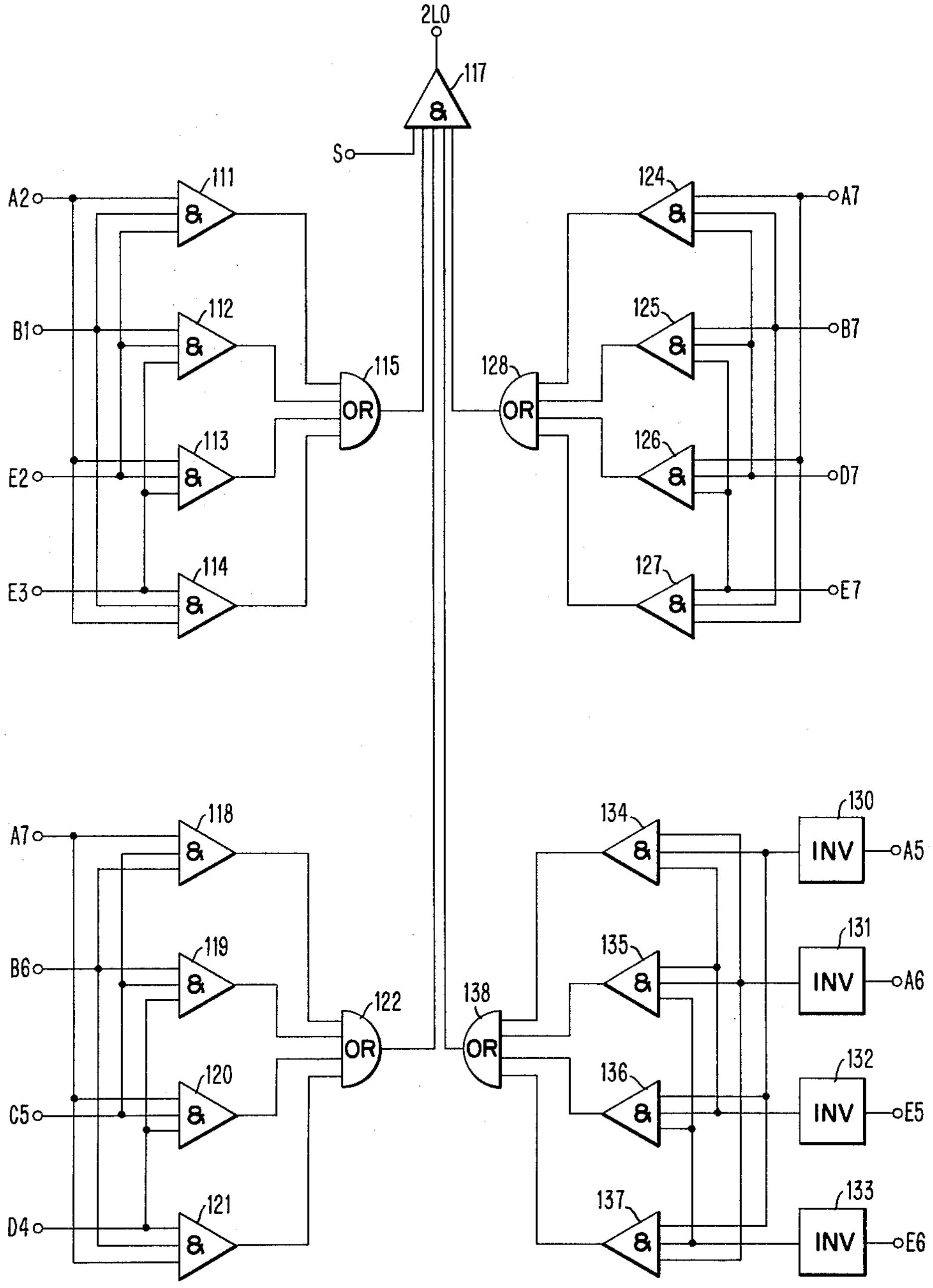

FIG. 4 is a diagrammatic illustration of one of the diode logic circuits utilized for the character recognition system shown in the previous drawings, and illustrates the circuitry employed in decoding the scanning information representing the character "2".

Similar reference characters refer to similar parts in each of the several views.

Referring now to FIGS. 1 and 2 of the drawings, there is shown a general schematic illustration of one embodiment of the present invention, in which parallel scanning of a character is provided, and in which a cascade-connected, or unidimensional shift register matrix is employed. The reference character 1 designates a document of some form, bearing characters such as the character "2" shown and designated by the reference character 2, which is to be recognized. The documents are transported for scanning by any suitable transport mechanism, of which only a portion is shown, including a pair of feed rolls 4 and 5, mounted on a common shaft 6 which is rotated at constant speed by a directly connected motor 8. A pair of pressure rollers 11 and 13 are mounted on suitably biased shafts so as to grip the document 1 between the pressure rollers and the feed rolls, thereby advancing the document in the direction shown by the arrow as the shaft 6 rotates.

An array of sensing elements H1 through H18, designated generally by reference character 15, is shown aligned transversely to the direction of motion of the document and the characters thereon. Each scanning element H1–H18 is arranged in such a manner that it examines a predetermined slice or path of the document as the document is fed past, and provides an output signal when a portion of the character to be recognized is passing thereunder. The sensing elements may constitute a plurality of photosensitive devices, with suitable masks or apertures to detect changes in reflected or transmitted light as caused by the presence of a portion of a character, or they may be magnetic pickup heads arranged to provide an output signal when any portion of a magnetized or magnetizable character passes thereunder. Each of the sensing elements 15 is connected to an individual channel of amplifying and shaping means indicated generally by the labeled rectangle 17, and thence to a plurality of corresponding terminals designated P1 through P18.

It should be noted that the number of sensing elements in the parallel sensing array are sufficient to provide a plurality of adjacent and concurrent scans through a character no matter where the character is located within the maximum misalignment tolerance. One feature of the invention provides for recognizing the character despite such misalignment, as will be subsequently explained in detail. From terminals P1–P18, the scanning information is supplied to inputs of a plurality of stages of a shift register 19 shown in FIG. 2, in a manner to be subsequently described. The entry of the scanning information into the shift register 19 and the subsequent handling of the information is governed by suitable synchronizing circuits which are primarily governed by the scanning means, in this case the document transport arrangement including the feed rolls 4 and 5 which carry the document past the sensing elements. In FIG. 1, there is shown a magnetic drum 21 mounted on shaft 6 for rotation therewith, this drum having a plurality of indexing or timing spots permanently recorded thereon by some suitable means and at suitable intervals as will be later defined. The passage of these timing marks past a pickup head 23 generates timing signals or pulses therein which are thereafter suitably amplified in a read amplifier 43 and utilized for generation of synchronizing pulses by a single shot 45. The synchronizing pulses are supplied to a terminal SYNC, and are also supplied via a delay circuit 65 to a terminal S.

FIG. 2 of the drawings shows the unidimensional shift register arranged to present the information contained therein in a 2-dimensional array. The information is entered at different predetermined points in the register and is advanced through the register by synchronizing pulses supplied to each of the elements. The register is arranged in such a manner that, when the scanning information reaches predetermined locations signifying the scanning of a particular character, outputs will be available to suitable logic circuits for providing an output indicative of the character scanned. As shown, a plurality of shift register elements designated SR1 through SR54 are arranged in cascade, the output of each unit being supplied to the input of the next succeeding unit. Information entered into these units or storage elements is shifted simultaneously from each unit to the next in response to the supply of pulses to each of the units from the terminal designated SYNC.

The details of the shift register are not shown, since they are not germane to the present invention, and it is deemed sufficient to point out that shifting registers or other delay devices of any suitable type may be employed.

The first eighteen of the shift register units are provided with inputs designated by the reference characters P1 through P18. These input terminals are connected to the primary scanning channels which in turn are connected through suitable amplifiers and shapers to the parallel scanning elements as illustrated in FIG. 1. Also, it can be seen from the drawings that the shift register units SR10 through SR54 are each provided with output terminals designated by reference characters indicating the column and row position of the shift register units in the rectangular portion of the matrix. That is, the shift register units SR10 through SR18 are provided with output terminals designated by the reference characters A1 through A9, respectively; units SR19 through S27 are provided with output terminals designated by the reference characters B1 through B9, respectively; units SR28 through SR36 are provided with output terminals designated by the reference characters C1 through C9, respectively; and units SR46 through SR54 are provided with output terminals designated by the reference characters E1 through E9. Certain of the columns and certain of the rows have been eliminated in order to simplify the drawings.

Thus, the lower or rectangular portion of the matrix shown in FIG. 2 is essentially a 2-dimensional rectangular matrix, and the characters scanned are recognized by patterns of information which fall within the coordinates of a nine-high, five-wide rectangular matrix pattern. It will be obvious that, if the scanning information is supplied from the scanning elements associated with the last nine shifting registers shown in the first column, in other words, if the scanning information is provided on the channels connected on the terminals P10 through P18, it can be seen that, as the information is shifted through the shifting register by the sync pulses, the character will, at some time during the scanning cycle, arrive in a position which the coordinate designations will be such as to provide an output to the proper logic circuit to indicate the scanning of that character. Moreover, the additional shifting register elements shown on the left-hand side of the drawing provide for the entry of scanning information anywhere within the maximum vertical misalignment tolerance, and since the information in these shift registers is shifted down until it occupies the first column of the rectangular portion of the matrix and is thereafter shifted serially, or "snaked through" the remaining columns of the matrix, it can be seen that a character of proper dimensions, scanned anywhere within the maximum misalignment tolerance, will be shifted through the shift register in such fashion that, at some portion of the scanning operation, an output will be provided through the logic circuits connected to the output terminals previously referred to.

The manner in which the pattern of information stored in the rectangular portion of the matrix may be utilized for determining a character scanned is illustrated in the series of drawings, FIGS. 3*a* through 3*j*. In these figures, there is shown at the left-hand side of each figure a pattern laid out in coordinates corresponding to the coordinates of the storage matrix, with the shape of a numeral in the series from 0 to 9 superimposed. The characters are laid out in the manner which may be produced by matrix or wire printing in which the characters are formed by a combination of small segments, such as dots, into a pattern which forms a total character. For example, in FIG. 3*a* there is shown the pattern for the numeral "2." It will be seen that a character formed in accordance with this pattern, when scanned, will supply information to the storage register matrix in such a manner that, when shifted through the matrix, certain of the storage elements will contain information in the positions corresponding to the coordinate designations by rows and columns in FIG. 3*a*. That is, a positive signal output will exist at the storage elements at locations A2, B1, C1, D1, E2, E3, D4, C5, B6, A7, B7, C7, D7 and E7.

Each of the remaining numerals may be analyzed in a similar fashion, and it will be apparent that, for each of the numerals shown, there will exist unique combinations of information in the storage matrix when the numeral is brought into registration by the shifting action of the shifting register.

It then remains to provide suitable means for detecting such unique combinations as define the characters to be recognized. Although a number of combinations may be arrived at, the present disclosure shows the use of combinations of three out of four conditions, using the presence of information in predetermined locations, and as a check against ambiguity, the absence of information at other specified locations. These conditions are set forth in the tables to the right of each of the character representations, in which tables the first column to the left indicates the reference number of the black or white conditions which are to be employed and the succeeding four columns show which information is to be combined to designate the presence or absence of information. For example, in FIG. 3*a*, three black combinations are shown, designated 1B, 2B and 3B, and one combination of white conditions designated as W. In the first set, 1B, the conditions in the first row are A2, B1, E2 and E3. In other words, one of the combinations which must be satisfied for the recognition of a character "2" is that information be present in the form of an output from the storage element in locations A2, B1, E2 and E3 in any combination of three out of four or four out of four. The second requirement is that three out of four of the conditions A7, B6, C5 and D4 must be present. The third condition is that three out of four of the conditions A7, B7, D7 and E7 must be present. The fourth set of conditions is that there must be white information at three out of four of the locations A5, A6, E5 and E6. If all four of these sets of conditions are met during the time that information is being shifted through the shifting register matrix, it is considered that the information within the matrix at that time indicates that a character "2" has been scanned.

These combinations of conditions are detected by means of suitable logic circuits, one for each characer to be recognized, and an example of which is shown in FIG. 4 of the drawings. The logic circuits shown in FIG. 4 of the drawings are those required for the detection of the combinations which indicate that a figure "2" has been scanned. Referring to FIG. 4, there are shown four groups of logic circuits which may be made up of the usual diode circuitry well known in the electronic calculator art, in which an AND function is indicated by a triangle and an OR function is indicated by a semicircle, one such combination of four AND circuits and one OR circuit being provided for each of the four sets of conditions which must be met for the recognition of the numeral "2." Thus, at the left-hand side of the drawing, there are shown four AND circuits designated by the reference characters 111 through 114, the outputs of which are combined in an OR circuit 115. The four AND circuits 111 through 114 each have three inputs, so that all of the combinations of three out of four conditions which exist for the first combination of black information are determined by the circuits. For example, the AND circuit 111 provides an output when the conditions A2, B1 and E2 are obtained. The AND circuit 112 provides an output when the shifting register contains black information at locations B1, E2 and E3. The AND circuit 113 provides an output when the conditions E2 and E3 and A2 are met, and the AND circuit 114 provides an output when the conditions E3, A2 and B1 exist. Thus all possible combinations of three out of four of the conditions required in row 1B of the table shown in FIG. 3*a* are provided for with these logic circuits.

If any one of these three out of four or four out of four conditions exist, then an output is provided from the OR circuit 115 to one input of an AND circuit 117, which AND circuit requires for its output the presence of an output from each of the other three combination circuits and additionally requires the presence of a delayed sample signal S, from the synchronizing circuits.

The AND circuits 118 through 121 respectively have their outputs connected to OR circuit 122 and detect any of the possible three out of four combinations defined by row 2B of the table of FIG. 1*a*. The AND circuits 124 through 127 respectively supply their outputs through OR circuits 128 to AND circuit 117 and detect any of the possible three out of four combinations defined by row 3B of table of FIG. 3*a*. It will be recalled that, in order to avoid ambiguities, the absence of information must be checked at predetermined locations within the shifting register matrix; and, as shown in FIG. 3*a*, these conditions are defined by the rows designated by the letter W with or without numerical prefixes. Since the presence of white information at a predetermined location is equivalent to the negative of black information present at a particular location, these conditions are checked by inverting the outputs of the storage triggers at the designated locations and thereafter supplying the inverted outputs to suitable AND and OR circuits. Thus, in FIG. 4, the trigger outputs A5, A6, E5 and E6 are supplied through inverters 130 through 133 respectively to the AND circuits 134 through 137, the outputs of which are combined in an OR circuit 138 and supplied to the final AND circuit 117.

Figure 3A:
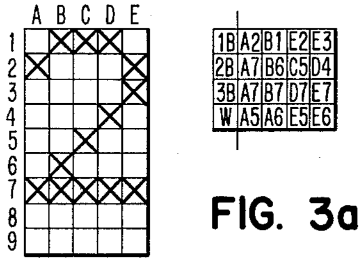
Figure 3B:
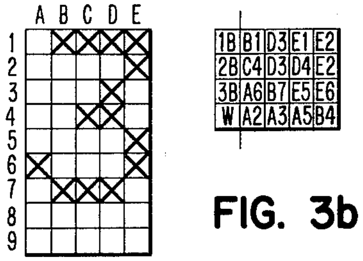
Figure 3C:
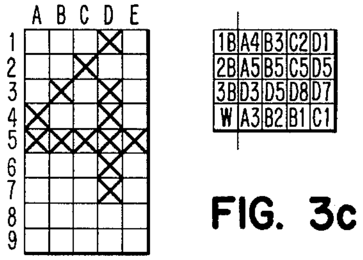
Figure 3D:
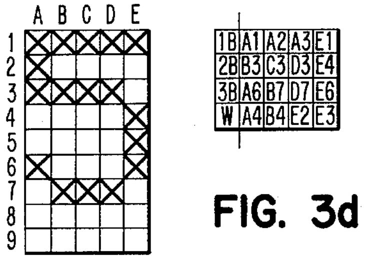
Figure 3E:
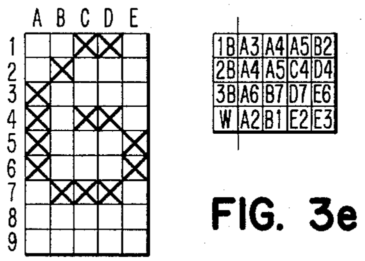
Figure 3F:
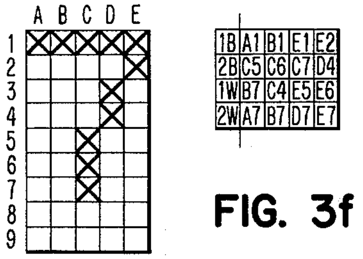
Figure 3G:
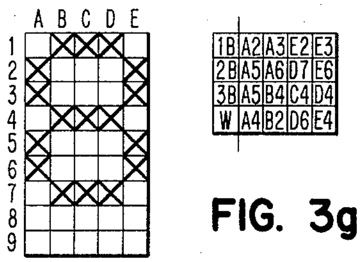
Figure 3H:
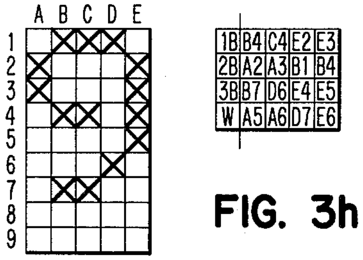
Figure 3I:
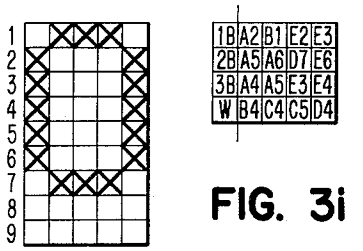
Figure 3J:
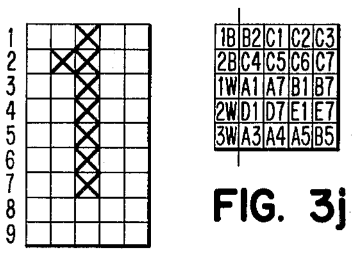

From the foregoing, it will be apparent that, when the conditions set forth in the table associated with FIG. 3*a* are met by the scanning information as it is progressively advanced through the storage matrix, an output signal will be supplied from the terminal 2L0 of AND circuit 117, indicating that a character "2" has been scanned.

Because erroneous outputs from the logic circuits might occur during the shifting operation, the final AND circuits in the logic, such as 117, are enabled to provide an output only when a sample pulse, S, is present. This pulse, provided for each shift pulse, is delayed by the delay unit 65 of FIG. 1, for a sufficient time interval to permit the triggers in the shifting register matrix to change state before sampling the recognition logic.

Similar logic circuits are utilized for the detection of each of the remaining characters shown in the tables, and it will be obvious to those skilled in the art that, not only can additional logic circuits be provided for the detection of characters other than those shown, but that other combinations of logic circuits may be used to detect characters having different shapes as represented by different type fonts. It should be noted in connection with the numerals "7" and "1," that there is a preponderance of white information present in the matrix when the numeral is in proper registration for recognition. Because of this fact, the table of combinations for the numeral "7," shown in FIG. 3*f*, includes two rows which show combinations of white conditions rather than a single row as shown in the remaining tables, and in the case of the numeral "1," the table of FIG. 3*j* indicates that three rows of combinations of white information are utilized in addition to two rows of black information, as contrasted with the usual use of three rows of black information and one row of white information. It should also be noted in the case of the numeral "1," that five sets of combinations are provided rather than four as done in the case of the other numerals; however, the philosophy behind the logic circuits is similar to that described in connection with FIG. 4, and the provision of tables of combinations such as shown in FIGS. 3*a* through 3*j* will enable one skilled in the art to readily design suitable logic circuits for recognizing any of the numerals defined in these drawings.

From the foregoing it can be seen that a character sensing system in accordance with the present invention will be characterized by high speed of operation, because of the use of electronic techniques and circuitry and by relative economy, since a relatively large area can be scanned for characters with a relatively small amount of apparatus. The results are obtained by use of a suitable matrix arranged to shift the scanning information through the matrix so that, despite misalignment of characters, the scanning information will be rapidly shifted through positions which determine the character scanned.

While the invention has been particularly shown and described with reference to a preferred embodiment thereof, it will be understood by those skilled in the art that various changes in form and details may be made therein without departing from the spirit and scope of the invention.

What is claimed is:

1. In a character recognition system, in combination,
parallel scanning means for scanning a character to be recognized in a plurality of adjacent and concurrent scans,
a shifting register comprising a plurality of stages connected in cascade,
means synchronized with said scanning means for entering scanning information in parallel into a corresponding series of stages of said shift register,
means synchronized with said scanning means for advancing information from stage to stage of said shifting register, and
logic circuit means connected to the outputs of predetermined ones of said stages effective when the location of scanning information in said stages signifies the scanning of a particular character for providing an output indicative of that character.

2. In a character recognition system, in combination,
a plurality of scanning elements arranged to scan characters to be recognized in a plurality of adjacent and concurrent scans, a undimensional shift register arranged in a 2-dimensional array of rows and columns,
input circuit means operatively connected to said scanning elements and the first column of said matrix to enter scanning information in parallel to said first column of said matrix,
synchronizing circuit means governed by said scanning means and connected to said matrix to serially shift information entered in parallel to said first column of said matrix to the succeeding columns of said matrix, and
logic circuit means connected to said matrix and effective when predetermined positions of said matrix contain scanning information to provide an output signal indicative of the character scanned.

3. In a character recognition system, in combination,
a plurality of scanning elements arranged to scan characters to be recognized in a plurality of adjacent and concurrent scans;
a unidimensional shift register arranged in a 2-dimensional array of rows and columns;
input circuit means operatively connected to said scanning elements and the first column of said matrix to enter scanning information in parallel to the first column of said matrix, said first column of said matrix having a plurality of stages equal in number to the number of said scanning elements and greater in number than the number of stages in subsequent columns of said matrix;
synchronizing circuit means governed by said scanning means and connected to said matrix to serially shift information entered in parallel to said first column of said matrix to the succeeding columns of said matrix; and
logic circuit means connected to said matrix and effective when predetermined positions of said matrix contain scanning information to provide an output signal indicative of the character scanned.

4. In a character recognition system, in combination,
a shift register having a plurality of stages arranged in rows and columns, the stages in each column being serially connected, and the columns being serially connected;
a plurality of scanning elements arranged to provide a plurality of adjacent and concurrent scans through a character, and sufficient in number to span the maximum character height plus the character misalignment tolerance, the number of scanning elements being equal to the number of stages in the first column of said shift register and the number of stages in subsequent columns being less than the number of stages in the first column, but at least as large as the number of scanning elements required to span a character of maximum dimension along the line of scanning elements;
means for supplying scanning information in parallel from said scanning elements to corresponding stages in the first column of said shift register;
means for advancing the information from stage to stage in said shift register; and
logic circuit means connected to preselected ones of said stages and responsive to predetermined patterns of stored information in said stages for providing an output indicative of the character scanned.

References Cited by the Examiner

UNITED STATES PATENTS

| | | | |
|---|---|---|---|
| 3,065,457 | 11/1962 | Bailey | 340—146.3 |
| 3,104,369 | 9/1963 | Rabinow et al. | 340—146.3 |
| 3,105,956 | 10/1963 | Greanias et al. | 340—146.3 |
| 3,142,824 | 7/1964 | Hill | 340—146.3 |
| 3,164,805 | 1/1965 | Holt et al. | 340—146.3 |
| 3,164,806 | 1/1965 | Rabinow | 340—146.3 |

MALCOLM A. MORRISON, *Primary Examiner.*